United States Patent [19]

Reh et al.

BEST AVAILABLE COPY

[11] 3,895,256

[45] July 15, 1975

[54] HORIZONTAL DEFLECTION CIRCUIT FOR TELEVISION RECEIVERS

[75] Inventors: Klaus Reh, Albershausen; Peter Schulz, Esslingen-Hegensberg, both of Germany

[73] Assignee: International Standard Electric Corporation, New York, N.Y.

[22] Filed: Aug. 31, 1973

[21] Appl. No.: 393,369

[52] U.S. Cl. .......... 315/371

[51] Int. Cl. .......... H01j 29/56

[58] Field of Search .......... 315/27 SR, 27 GD, 27 R, 315/27 TD, 28, 29

[56] References Cited

UNITED STATES PATENTS

| | | | |
|---|---|---|---|
| 3,628,082 | 12/1971 | Dietz | 315/27 SR |
| 3,732,458 | 5/1973 | Wölber | 315/27 SR |
| 3,781,590 | 12/1973 | Chapman | 315/27 SR |
| 3,803,447 | 4/1974 | Wölber | 315/27 SR |

*Primary Examiner*—Maynard R. Wilbur
*Assistant Examiner*—G. E. Montone
*Attorney, Agent, or Firm*—John T. O'Halloran; Menotti J. Lombardi, Jr.; Peter Van Der Sluys

[57] ABSTRACT

In the conventional RCA-type horizontal sweep or deflection circuit employing thyristors, energy supply is controlled by means of a transductor connected in parallel with the input inductance. This requires relatively large inductances, a considerable conversion of energy, and causes a strong heating of the components.

According to the invention a parallel connection consisting of a diode and a transductor has been arranged in series with the input inductance, so that only substantially smaller components are required. Saving is estimated at about one quarter of the involved component costs.

The invention has originated in the course of drafting a circuit for 110° thin-neck picture tubes for the use in color TV sets.

2 Claims, 1 Drawing Figure

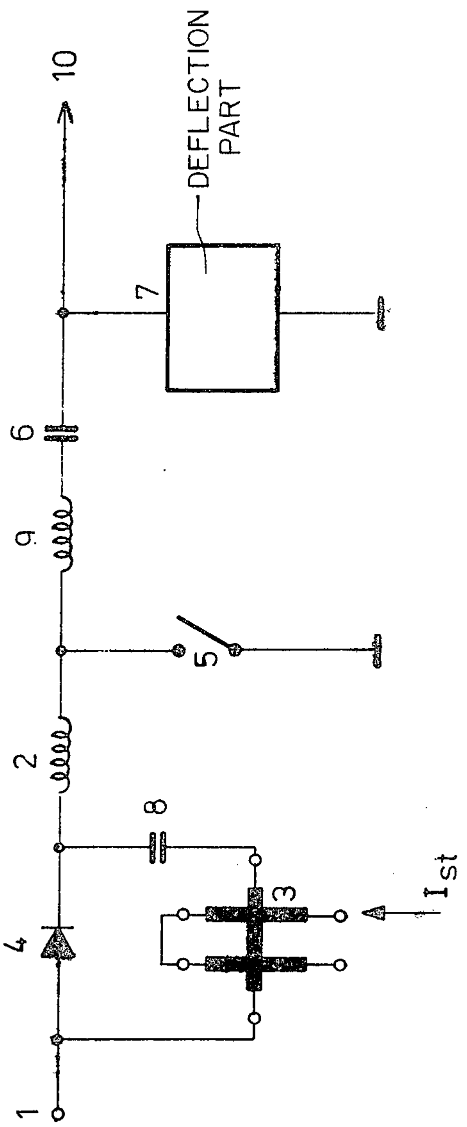
1
4
3
8
2
5
9
6
7
DEFLECTION PART
10
$I_{st}$

HORIZONTAL DEFLECTION CIRCUIT FOR TELEVISION RECEIVERS

The present invention relates to a horizontal deflection circuit for television receivers, substantially comprising a part controlling the line sweep, a commutating part, and a deflecting part.

The energy applied to such a horizontal deflection circuit must be controllable, and a suitable controllable supply circuit consists e.g., of a source of DC voltage and of a storage inductance.

A horizontal sweep or deflection circuit is known from the German Printed Application (DAS), No. 1 537 308 which is incorporated herein by reference producing a periodic sawtooth current within the respective deflection coil of the picture tube, the deflection coil is connected, in a first current branch, via a first controlled switch, conductive in both directions, to a sufficiently large capacitor serving as a current source, the controlled switch being formed by antiparallel connection of a controlled rectifier with a diode. The control electrode of the rectifier is connected to a driving-pulse source which renders the switch conductive during part of the sawtooth sweep.

Disconnection of the controlled rectifier is effected by means of a commutation process, i.e., by a current reversal in the controlled rectifier which is initiated by a second controlled switch.

The first controlled switch is also part of a second current branch which, in series with the controlled switch, contains a second current source and a reactance capable of oscillating. When the first switch is closed, the reactance, essentially comprising a coil and a capacitor, receives energy from the second current source in a certain time interval. This energy, which is taken from the second current source, corresponds to the circuit losses caused during the previous deflection period.

In the above-described known basic circuit, however, no consideration has yet been given to the fact that it is common practice to connect the high-voltage transformer, necessary for the operation of the picture tube, to the horizontal final stage, too.

A circuit arrangement completed with regard thereto is shown in detail, and its mode of operation is explained, in "RCA-Halbleitertechnik" No. AN 3780-8.68/1271 d - 11.68 which is incorporated herein by reference.

In this known circuit, which is largely identical to the first described circuit, the high voltage necessary to operate the picture tube is produced by the horizontal flyback pulses being stepped up to the necessary voltage in a step-up transformer with the voltage being applied to te picture tube via a rectifier arrangement. The high voltage transformer is connected in parallel to the deflection system. Since the energy taken from the high-voltage transformer is not constant as a function of the beam current changes, the high voltage must be readjusted because of the finite resistance of the high-voltage source. This means that the energy applied to the horizontal final stage must be equal to the above-mentioned losses of the deflection circuit itself plus the energy necessary to operate the tube.

It has already been mentioned that the energy applied to the horizontal final stage is received in a reactance. The control of the applied energy is effected by a capacitor, here the flyback capacitor of the horizontal final stage, being connected to a DC voltage source via an inductance inserted between the DC voltage source and the capacitor, with the latter being nearly at resonance with this inductance. A change in the applied energy is made by varying the inductance. To this end, an additional variable inductance, which is represented by a transductor, is connected in parallel.

The voltage variations of the source of DC voltage, which are to be expected, have a decisive influence upon the necessary extent of the control or regulating range of such a supply circuit. This voltage is derived from the mains voltage.

The conventional supply circuit has the disadvantage that the inductances, i.e. the storage inductance as well as the parallel-arranged transductor must be chosen to have very large dimensions. This will be easily understood when briefly considering the extreme cases as regards the supply voltage variations.

In cases where the supply voltage value is at the lowest admissible limit, the inductive resistance of the transductor must be so high that the value of the total inductance of the parallel arrangement is practically only determined by the storage inductance. However, in cases where the supply voltage value is at the upper limit, the transductor is supposed to have a low as possible inductive resistance, so that the value of the total inductance of the parallel arrangement is practically determined by the transductor only.

It is the object of the present invention to provide a horizontal sweep or deflection circuit of the aforementoned type comprising a simple as possible and little expensive supply circuit, with the control range of the conventional circuit arrangement at least being maintained.

The horizontal deflection circuit according to the invention is characterized by the fact that into the series arrangement consisting of the source of direct voltage and the storage inductance, there is inserted a rectifier whose forward direction corresponds to the direction of flux of the supply current, and that a variable inductance is connected in parallel with said rectifier.

By reducing in size the individual elements, this solution also offers the advantage that both the storage inductance and the commutating coil can be combined to form one component which is simple from a constructional point of view.

Further advantages of the invention as well as the funtioning of the arrangement may be taken from the following description and from the accompanying drawing.

In FIG. 1 there is shown a simplified circuit diagram of the horizontal deflection circuit in which there are only shown those elements, in particular of the supply circuit, which are absolutely necessary for understanding the invention.

To the input terminal 1 there is applied the supply DC voltage $U_B$ as derived from the mains voltage and which, in accordance with the mains voltage variations, is likely to fluctuate within a range of about ± 15 percent. To the terminal 1 there is connected the input inductance of the supply circuit consisting substantially of the fixed storage inductance 2 and of the variable inductance 3, e.g., in the form of the operating winding of a transductor. Controlling the inductance of the operating winding is accomplished by the control current Ist in the control winding of the transductor. The control current Ist is supplied by a not shown control circuit. Such types of control circuits, including the generation of the control quantity, are already known, e.g., from the prior publications mentioned hereinbefore.

To the output of the storage inductance 2 there is connected the series arrangement consisting of the commutating coil 9, of the commutating capacitor 6 and of the actual deflection part 7 with which the commutating switch 5 is connected in parallel.

The terminal 10 is supposed to indicate schematically that also the high-voltage generating circuit is connected to the horizontal final stage.

In the closed condition of the commutating switch 5 a sawtooth-like increasing current flows from terminal 1 via the rectifier 4 inserted in the forward direction, as well as via the storage inductance 2 and the commutating switch 5 to ground.

In the course of this, energy is being stored in the storage inductance 2 which, as is well known, corresponds to the value ½ $Li^2$.

Upon opening the switch 5, the current will flow via the storage inductance 2 into the commutating capacitor 6, with the energy stored in the storage inductance partly being transferred to this capacitor.

Both the storage inductance 2 and the commutating capacitor 6 form a structure which is capable of oscillating; for this reason, after the lapse of a certain time, there is initiated an energy exchange in the opposite direction, i.e., the commutating capacitor 6 now supplies energy to the storage inductance 2 and, as will be explained hereinafter, also again back to the mains.

The inductance 9 may remain unconsidered in this respect.

This return supply of energy to the mains can now be controlled by the part 3 of the total inductance as lying at the input of the circuit and which is variable with respect to its inductance, because in this direction of current flux, the diode 4 is in the reverse direction.

With the aid of this control, the residual energy as remaining in the commutating capacitor 6, may always be kept constant at the time position of reclosing the commutating switch 5.

This, however, means to imply that the amplitude of the deflecting current is made independent of the mains voltage fluctuation, because the amplitude of the deflecting current is exclusively dependent of or determined by the energy existing in the commutating capacitor 6 at the above-mentioned time position.

From the fact that in this case both the storage inductance 2 and the variable inductance 3 are connected in series, it will result that the influence of a variation in the resistance of a component, i.e., of the inductance of coil 3, upon the total behaviour is substantially greater than would be the case in the conventional type of parallel arrangement. This means to imply that the same required degree of control is achievable with the aid of fewer means. The capacitor 8 serves the fixing of the operating point of the diode 4 and, moreover, acts as an additional energy storage device.

In practice, there will still result an added advantage.

When taking, for a practical example, the energy consideration referred to in the preamble of this specification, it will result that the energy as stored in the input inductance, in the case of a series connection, amounts to less than one third of the energy existing in the parallel arrangement. Since the enery storage devices also have a non-negligible ohmic resistance, the power dissipation and, consequently, the heat energy to be dissipated will naturally also be substantially smaller in the series arrangement.

This is of considerable importance especially with regard to the high packing density in the equipments.

What is claimed is:

1. A horizontal deflection circuit for a television receiver having a horizontal final stage including means for controlling line sweep and commutation, the energy required by said horizontal final stage being provided by a controllable supply circuit comprising:

a source of DC energy;

a storage inductance;

a variable inductance connected in series with said storage inductance, said series connection being disposed between said source of DC energy and said horizontal final stage; and a rectifier connected in parallel with said variable inductance to allow current from said source of DC energy to bypass said variable inductance and flow directly to said storage inductance, whereby current returning to said DC source from said storage inductance must flow through the variable inductance and be controlled thereby.

2. A horizontal deflection circuit as described in claim 1, additionally comprising a capacitor connected in series with said variable inductance, said series connection being connected in parallel with said rectifier.

* * * * *